March 9, 1971
H. BERENTZEN
3,568,472
LATCH NEEDLE FOR KNITTING MACHINES
Filed Dec. 3, 1968
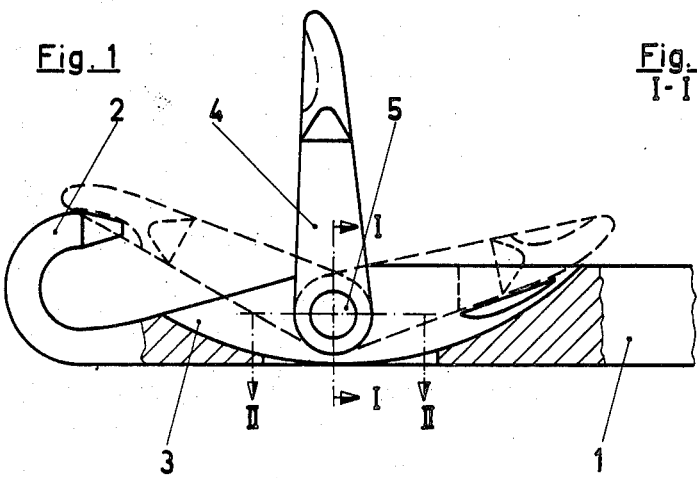
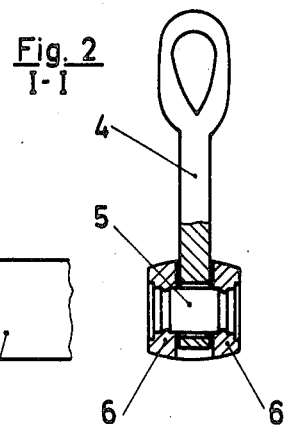
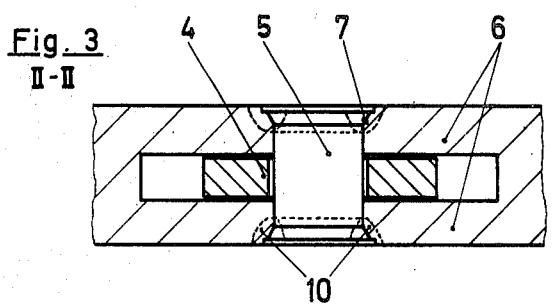
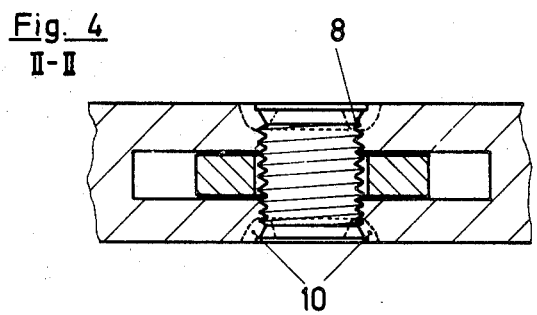
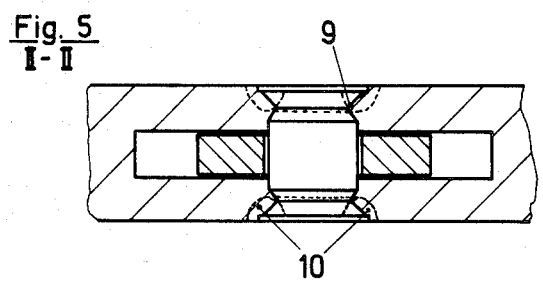
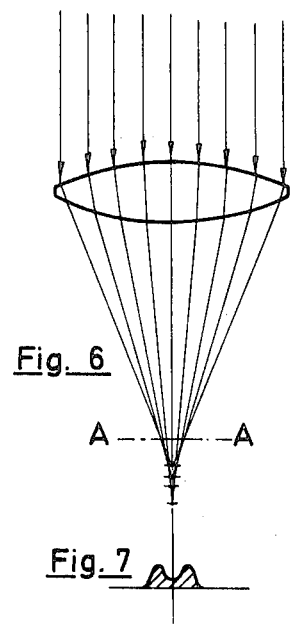
INVENTOR.
HARDO BERENTZEN
BY
Lowry, Rinehart & Harkov

United States Patent Office 3,568,472
Patented Mar. 9, 1971

3,568,472
LATCH NEEDLE FOR KNITTING MACHINES
Hardo Berentzen, Ebingen, Wurttemberg, Germany, assignor to Theodor Groz & Sohne & Ernst Beckert Nadelfabrik Commandit-Gesellschaft, Ebingen, Germany
Filed Dec. 3, 1968, Ser. No. 780,640
Claims priority, application Germany, Dec. 18, 1967, P 16 35 810.4
Int. Cl. D04b 35/04
U.S. Cl. 66—122                                4 Claims

ABSTRACT OF THE DISCLOSURE

A latch needle for knitting machines having a latch which is pivotally mounted on a bearing pin between two shaft faces. The pin is mounted in two holes located in the shaft faces and is welded to the bearing pin. The welding regions connecting the pin with the shaft faces are located only or principally on the outside surfaces of the shaft faces. The pin is positively pre-located in the holes of the shaft faces.

BACKGROUND OF THE INVENTION

The invention relates to a latch needle for knitting machines, the latch of which is pivotal about a pin between two shaft faces, the pin being mounted in holes in both shaft faces and welded therein.

In latch needles so formed the pin must present a stable and precise pivotal axis and must hold the shaft faces permanently together against the considerable lever forces which are exerted on the needle latch by the threads to be knitted.

In hitherto known embodiments of this kind, the welding regions connecting the pin with the shaft faces extend over the whole depth of the shaft faces. There is thus a possibility of an excessive temperature rise in the region of the latch bore with the risk of jamming, or even the latch being welded to the pin, and of gas formation in the material of the pin resulting in a reduction of the strength thereof.

The object of the present invention is to arrange the welding regions for welding the pin to the shaft faces so that no excessive temperature rise occurs in the region of the latch bore.

SUMMARY OF THE INVENTION

In accordance with the invention the welding regions connecting the pin with the shaft faces are located only or principally on the outer surfaces of the shaft faces, the pin being positively located by other means in its holes.

The slight penetration depth of the welding region mentioned herein may be realised by means of known laser or electron beam welding methods. A needle formed in accordance with the invention combines a positive location of the pin with the shaft faces with a welding action of such slight penetration depth that they do not extend to the bearing surfaces of the latch, so that its mounting on the pin is unaffected by the welding action.

This differentiates the invention from a known welding of two opposing projections shearingly pressed out and projecting towards one another in the bore of the latch by means of laser beam welding, because the bearing pin so formed is not as good as the arrangement described above. Thus the laser beam welding described is such that the region of maximum heat is located within the latch bore, presenting the risk of excessive temperature rise and jamming with insufficient clearance between the latch bore and bearing pin, and consequent distortions.

The restricted area of the heating region in the present invention does not impair strength of the pin core, so that the second function of the pin, that of holding together the two needle shaft faces is fully carried out.

For this purpose it is advantageous for the welding to be concentrated at the annular joint between pin and needle shaft faces, which region may be welded completely or partially.

Partial welding may be restricted to some points of this annular region or it may even be a spot welding.

BRIEF DESCRIPTION OF THE DRAWINGS

Some embodiments of the invention are shown schematically in the accompanying drawings, in which:

FIG. 1 is a side view of a latch needle, partly in longitudinal section,

FIG. 2 is a cross-section on the plane I—I of FIG. 1,

FIGS. 3–5 each show a sectional view in the region II—II on an enlarged scale for three different pre-locations, FIG. 6 is a diagram showing beam de-focusing, and FIG. 7 shows the energy distribution during welding on the plane A—A of FIG. 6.

DESCRIPTION OF SPECIFIC EMBODIMENT

FIG. 1 of the drawing shows the shaft 1 of a latch needle, from one end of which a hook 2 is formed. A latch 4 is pivoted about a pin 5 in a slot 3 of the shaft 1 so as to co-operate with the hook 2. The pin 5 is positively connected at both its ends to the shaft faces 6 as shown in FIG. 3 by simple upsetting 7, or as shown in FIG. 4 by means of a thread 8 screwed therein and end upsetting, or as shown in FIG. 5, by annular bead and annular groove pairing 9, the pair being thus pre-located for the welding by laser beam or electron beam—the latter should be carried out in a vacuum.

The welding region 10 is a ring in the region of the axle pin circumference on the outside of the shaft faces, at the butt joint between the pin and its bearings in the shaft faces 6. This concentration of the welding energy over an annular region may be attained as shown in FIG. 6 on plane A—A which is located in front of the focal point of an energy beam, the latter having a peripheral region with greater energy concentration than centre, so that the energy distribution occurs as shown in FIG. 7. This produces a suitable annular welding action.

Partial spot welding and welding not restricted to the annular region may also be effected. All such welding processes extend only over a partial wall thickness of the shaft faces 6, as clearly shown by FIGS. 3–5. The pin core remains unchanged. Its faces are countersunk in the shaft 1.

I claim:

1. A latch needle for knitting machines comprising:
    (a) a shaft divided at one end into two faces,
    (b) each face including a hole,
    (c) a bearing pin positively located in said holes, (d) a latch pivotally mounted on said pin between said shaft faces, and
(e) weld joints between said pin and said faces,
(f) said weld joints being confined to the outside surfaces of said shaft faces.

2. A latch needle as defined in claim 1 wherein the weld joints further are confined between the annular surfaces of the pin and the outside surface of the shaft faces.

3. A latch needle as defined in claim 2 wherein the weld joints extend completely around the region between the annular surfaces of the pin and the outside surface of the shaft faces.

4. A latch needle as defined in claim 2 wherein the weld joints extend partially around the region between the annular surfaces of the pin and the outside surface of the shaft faces.

References Cited

UNITED STATES PATENTS

| 427,134 | 1890 | Treat | 66—122 |
|---|---|---|---|
| 1,094,737 | 1914 | Meeh | 66—122 |

FOREIGN PATENTS

| 1,159,585 | 12/1963 | Germany | 66—122 |

RONALD FELDBAUM, Primary Examiner